(12) United States Patent
Mustakangas et al.

(10) Patent No.: US 12,496,538 B2
(45) Date of Patent: Dec. 16, 2025

(54) OUTLET PIECE ASSEMBLY FOR A HORIZONTAL PLATE AND FRAME-TYPE FILTER, SUCH AS A TOWER PRESS

(71) Applicant: Metso Outotec Finland Oy, Tampere (FI)

(72) Inventors: Mirva Mustakangas, Pirkkala (FI); Ismo Juvonen, Rauha (FI); Janne Kaipainen, Halsua (FI); Teemu Eloranta, Luumäki (FI); Mika Illi, Vantaa (FI); Kari Vänttinen, Espoo (FI)

(73) Assignee: METSO FINLAND OY, Espoo (FI)

( * ) Notice: Subject to any disclaimer, the term of this patent is extended or adjusted under 35 U.S.C. 154(b) by 496 days.

(21) Appl. No.: 17/921,804

(22) PCT Filed: Jun. 3, 2020

(86) PCT No.: PCT/FI2020/050390
§ 371 (c)(1),
(2) Date: Oct. 27, 2022

(87) PCT Pub. No.: WO2021/245322
PCT Pub. Date: Dec. 9, 2021

(65) Prior Publication Data
US 2023/0173411 A1  Jun. 8, 2023

(51) Int. Cl.
*B01D 25/30* (2006.01)
*B01D 25/164* (2006.01)
*B01D 25/21* (2006.01)

(52) U.S. Cl.
CPC ....... *B01D 25/305* (2013.01); *B01D 25/1645* (2013.01); *B01D 25/215* (2013.01); *B01D 25/302* (2013.01)

(58) Field of Classification Search
CPC .............. B01D 25/305; B01D 25/1645; B01D 25/215; B01D 25/302
See application file for complete search history.

(56) References Cited

U.S. PATENT DOCUMENTS

2010/0163476 A1  7/2010  Bonn

FOREIGN PATENT DOCUMENTS

| CN | 204671950 U | 9/2015 |
| CN | 208611872 U | 3/2019 |

(Continued)

OTHER PUBLICATIONS

International Search Report and Written Opinion for International Application No. PCT/FI2020/050390, mailed Nov. 18, 2020.
(Continued)

*Primary Examiner* — Liam Royce
(74) *Attorney, Agent, or Firm* — Andrus Intellectual Property Law, LLP

(57) ABSTRACT

An outlet piece assembly for a horizontal plate and frame-type filter, such as tower press. The disclosure is based on the idea of providing the outlet piece assembly as having a base removably attachable to a filter press (e.g., to the filter plate or plate frame thereof), and a lid removably fixed to the base, such that an internal conduit of the outlet piece assembly running between a vat end and a discharge end is formed between the base and the lid. This enables a part of an associated filtrate vat component, such as the vat liner, to be received between the base and the lid, thereby ensuring secure sealing between these components.

10 Claims, 2 Drawing Sheets

(56) References Cited

FOREIGN PATENT DOCUMENTS

GB 645586 A 11/1950
GB 907503 A 10/1962

OTHER PUBLICATIONS

International Preliminary Report on Patentability for International Application No. PCT/FI2020/050390, dated Sep. 19, 2022.
Office Action for corresponding Chinese Patent Application No. 2021106145432, issued Aug. 31, 2022.
"Basic Situation of Foreign Machinery Industry", edited by General Machinery Research Institute of the Ministry of Machinery-Building Industry, p. 143, Machinery Industry Press (Referred to in the attatched Chinese Office Action Translation.).
"Anti-Corrosion of Organic Intermediate Production Equipment", translated by Yin Zongtai, pp. 113-114, China Industrial Press (Referred to in the attached Chinese Office Action.).
"Plastic Spraying and Coating", edited by Shanghai Science and Technology Translation Center, p. 11, published by Shanghai Science and Technology Translation Center (Referred to in the attached Chinese Office Action.).
Office Action for corresponding Chinese Patent Application No. 2021106145432, issued Apr. 21, 2023.

OUTLET PIECE ASSEMBLY FOR A HORIZONTAL PLATE AND FRAME-TYPE FILTER, SUCH AS A TOWER PRESS

CROSS-REFERENCE TO RELATED APPLICATIONS

This application is the U.S. national stage application of International Application PCT/FI2020/050390, filed Jun. 3, 2020, which international application was published on Dec. 9, 2021, as International Publication WO 2021/245322 A1 in the English language.

FIELD OF THE DISCLOSURE

The present disclosure relates to horizontal plate and frame-type filters, such as tower presses, and more particularly to an outlet piece assembly for conducting filtrate out from a filtrate vat of such filter

BACKGROUND OF THE DISCLOSURE

In conventional horizontal filter plate and frame-type filters, such as tower presses, filtrate is collected to a filtrate vat from a filter chamber formed above the vat. The filtrate vat has typically been provided as a separate, replaceable component forming a receptacle for receiving the filtrate, and has been placed on top of a substantially flat filter plate.

However, it has been noticed, that such a wear resistant separate filtrate vat is prone to creeping under as it is repetitively compressed over numerous filtration cycles. Creeping of the vat subsequently lead to problems related to sealing the filtrate vat against a filter plate assembly above. Worn filtrate vat have thus been replaced after becoming excessively deformed. Moreover, it has not been generally considered feasible to change the material of the filtrate vat so as to better resist deformation due to creeping, because this has been considered to result in unsatisfactory wear-resistance characteristics caused by the abrasive nature of the finer particles carried by the slurry, and a possible subsequent drying air flow.

It has also been noted that conventional, separate filtrate vats have faced issues related to contamination from the slurry to be filtered and other process fluids. Particularly, slurry that has reached the interface between the filter plate and the filtrate vat may travel underneath the filtrate vat due to the capillary effect and the repetitive compression of the filtration cycles. Such impurities cause a bulge on the otherwise flat filter plate, thereby leading to premature wear of the filtrate vat and even breakage thereof. Moreover, slurry or other process fluid contamination may corrode fasteners used to attach the filtrate vat to the filter plate, thereby hindering the maintenance of the associated filter, such as replacement of the filtrate vat.

BRIEF DESCRIPTION OF THE DISCLOSURE

It has been discovered that the above-mentioned problems related to the conventional, separate filtrate vats may be overcome by providing a filter plate of sufficiently creeping-resistant material with filtrate vat integrally formed thereon. Furthermore, to increase the wear resistance of such an arrangement, a vat liner may be provided so as to cover the filtrate vat and protective it from abrasive flow of the finer particles of the filtrate. However, in order to prevent damage to the vat liner caused by contamination from filtrate, slurry or other process in between the vat liner and filtrate vat, it must be ensured that such fluids do not penetrate into the interface between the filtrate vat and the liner.

Consequently, it is an object of the present disclosure is to provide an outlet piece assembly providing secure sealing between the vat liner and the outlet piece, thereby preventing filtrate from travelling in between the vat liner and the filtrate vat at the outlet opening.

The object of the disclosure is achieved by the outlet piece assembly which is characterized by what is stated in the independent claim. The preferred embodiments of the disclosure are disclosed in the dependent claims.

The disclosure is based on the idea of providing the outlet piece assembly as having a base removably attachable to a filter press (e.g., to the filter plate of plate frame thereof), and a lid removably fixed to the base, such that an internal conduit of the outlet piece assembly running between a vat end and a discharge end is formed between the base and the lid.

This enables that a part of an associated filtrate vat component, such as the vat liner, may be received between the base and the lid, thereby ensuring secure sealing between these components. It should be noted that the outlet piece assembly may also be configured to be used in connection with a conventional separate filtrate vat without a vat liner, in which case a part of the filtrate vat itself may be received between the base and the lid, thereby ensuring secure sealing between the filtrate vat, the base and the lid.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
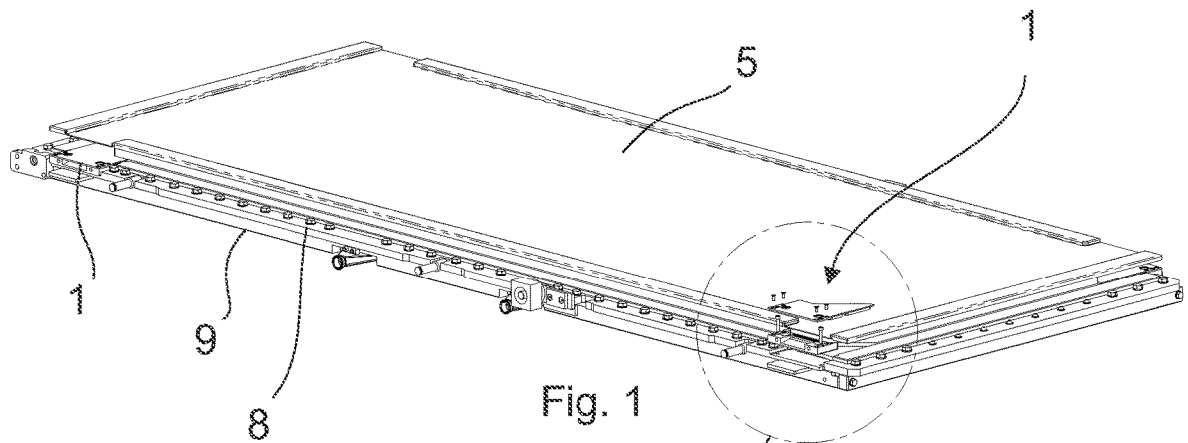
FIG. 1 illustrates an outlet piece assembly in connection with a filter plate assembly incorporating an integral filtrate vat and vat liner, as seen as an exploded perspective view.

According to a first aspect of the present disclosure, an outlet piece assembly 1 is provided for conducting filtrate out from a filtrate vat 8a of a horizontal filter press, such as a tower press.

The outlet piece assembly 1 has an internal conduit 2 for conducting said filtrate, and comprises a base 3 removably attachable to a filter press and a lid 4 removably fixed to the base 3. Particularly, the internal conduit 2 is formed between the base 3 and the lid 4, and runs between a vat end 1a and a discharge end 1b of the outlet piece assembly 1.

For example, the base 3 may be removably attachable to either or both of a filter plate 8 or a plate frame 9 supporting the filter plate 8.

Preferably, but not necessarily, the lid 4 is attached to the base 3 vertically with respect to the filtrate vat component, such as the vat liner 5, or a part of the filtrate at 8a to be received between the base 3 and the lid 4. This allows the filtrate vat component or the filtrate vat 8*a* to be clamped between the base 3 and lid 4, further improving a secure and sealed attachment As discussed earlier, such an arrangement enables a part of an associated filtrate vat component, such as the vat liner 5, or a part of the filtrate vat 8*a* to be received between the base 3 and the lid 4, thereby ensuring secure sealing between these components.

In an embodiment according to the first aspect of the present disclosure, the outlet piece assembly 1 comprises a recessed seat 3*a* at the vat end 1*a* thereof, into which a portion of the filtrate vat component, such as the vat liner 5, or a portion of the filtrate vat 8*a* is receivable. Most suitably, the recessed seat 3*a*, is provided at the base 3.

Preferably, but not necessarily, the lid 4 comprises one or more projections 4*a* extending towards the base 3.

For example, such projections 4*a* could be provided as one or more elongate ribs extending in the direction of the internal conduit 2, i.e., along the direction in which the filtrate is intended to flow within the internal conduit 2.

Preferably, but not necessarily, the outlet piece assembly 1 is configured clamp a portion of the filtrate vat component, such as the vat liner 5, or a part of the filtrate vat 8*a*, received in the recessed seat 3*a* between the projections 4*a* and the recessed seat 3*a*, thereby securing the outlet piece assembly 1 with respect to the portion of the filtrate vat 8*a*.

Preferably, but not necessarily, a seal arrangement is provided at the recessed seat 3*a* configured for sealing against the part of the filtrate vat component, such as the vat liner 5, or the part of the filtrate vat 8*a* received at the recessed seat 3*a*.

Preferably, but not necessarily, the base 3 comprises a recessed chute 3*b* at the discharge end 1*b* as a continuation of the recessed seat 3*a* for conducting filtrate out of the outlet piece assembly 1. For example, the recessed chute may be recessed at a level aligned with the part of the filtrate vat component, such as the vat liner 5, or the part of the filtrate vat 8*a* received in the recessed seat 3*a*.

In an embodiment according to the present disclosure at least the base 3 and the lid 4 are made of a creeping-resistant material. Examples of such materials include, but are not limited to, metals, such as steel, FRP (fibre-reinforce plastics) materials, such as reinforced composite materials with a thermoset or thermoplastic matrix, and thermoset materials.

In an embodiment according to the first aspect of the present disclosure, at least portions of the base 3 and lid 4 forming the internal conduit 2 are coated with a wear-resistant material. Example of such materials include, but are not limited to, wear resistant polymers, such as thermoplastics including thermoplastic vulcanizates and thermoplastics elastomers, PUR and rubber.

In addition to improving the wear-resistance characteristics of the outlet piece assembly 1, such a coating further improves sealing of base 3 against the lid 4, and the sealing of the outlet piece assembly 1 against other components, e.g. the filter plate 8 and the filtrate vat component, such as vat liner 5, or a separate filtrate vat.

In an embodiment according to the first aspect of the present disclosure, the base 3 comprises one or more first attachment holes 6*a* extending therethrough for receiving a fixing element 7*a* attaching the base 3 to the filter press. As discussed above, the base 3 may be fixed, for example, to either or both of the filter plate 8 or the plate frame 9 supporting the filter plate 8.

Preferably, but not necessarily, the one or more first attachment holes 6*a* are situated on a portion of the base 3 not forming a part of the internal conduit 2. Such an arrangement, that the fixing elements 7*a* are less likely to seize due to contamination of the filtrate running in the internal conduit 2.

In an embodiment according to the first aspect of the present disclosure, the base 3 comprises one or more second attachment holes 6*b*, and the lid 4 comprises one or more third attachment holes 6*c*, aligned with the second attachment holes 6*b*. The lid 4 is then fixed to the base 3 with a fixing element 7*b* inserted into the second attachment hole 6*b* through the third attachment hole 6*c*.

Preferably, but not necessarily, the one or more second attachment holes 6*b* are situated on a portion of the base 3 not forming a part of the internal conduit 2, and the one or more third attachment holes 6*c* are situated on a portion of the lid 4 not forming a part of the internal conduit 2. Such an arrangement, that the fixing elements 7*b* are less likely to seize due to contamination of the filtrate running in the internal conduit 2.

FIG. 1 illustrates an outlet piece assembly 1 in connection with a filter plate assembly incorporating an integral filtrate vat and vat liner 5, as seen as an exploded perspective view. In the arrangement of FIG. 1, a filter plate 8, supported by a plate frame 9, integrally forms a filtrate vat 8*a*. The integral structure of the filtrate vat 8*a* is provides the filter plate assembly with sufficient creeping-resistant characteristic, while the vat liner 5 protects the filtrate vat from abrasion caused by the solid particles carried by the filtrate. It should be noted that although FIG. 1 depicts only two outlet piece assemblies 1, any number of such outlet piece assemblies may be provided, for example at each corner of the filtrate vat.

Figure 2:
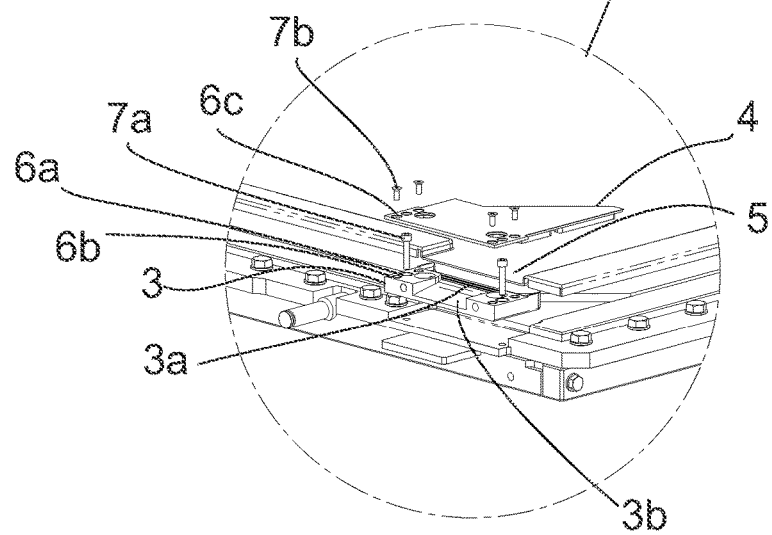
FIG. 2 illustrates a detailed view of a portion of FIG. 1.

The outlet piece assembly 1 and the portion of the filter plate assembly encircled in FIG. 1 are illustrated as a more detailed view in FIG. 2. Particularly, FIG. 2 shows the mutual assembly order of the filter plate 8, the base 3, the vat liner 5, and the lid 4. In other words, the base 3 of the outlet piece assembly 1 is attachable to the filter plate assembly with fixing elements 7*a* insertable through first holes 6*a* on the base 3. The vat liner 5 is then placed on the filtrate vat 8*a* formed by the filter plate 8 and the base 3, and the lid 4 is then finally attached to the base 3, on top of the vat liner 5, with fixing element 7*b* inserted through third holes 6*c* into second holes 6*b*.

Figure 3:
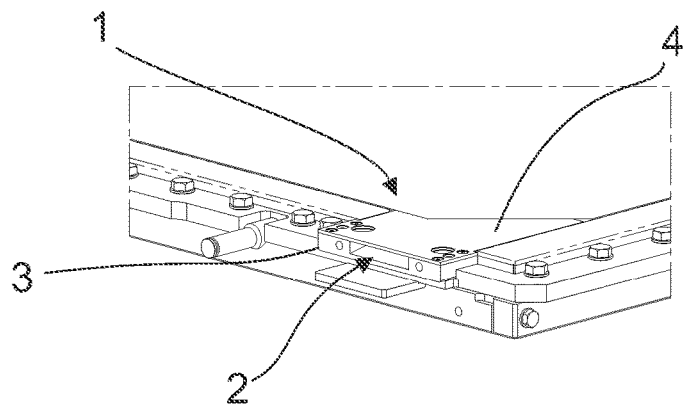
FIG. 3 illustrates the arrangement shown in FIG. 2 in a non-exploded configuration.

FIG. 3, in turn, illustrates the detailed view of FIG. 2 in a non-exploded configuration.

Figure 4:
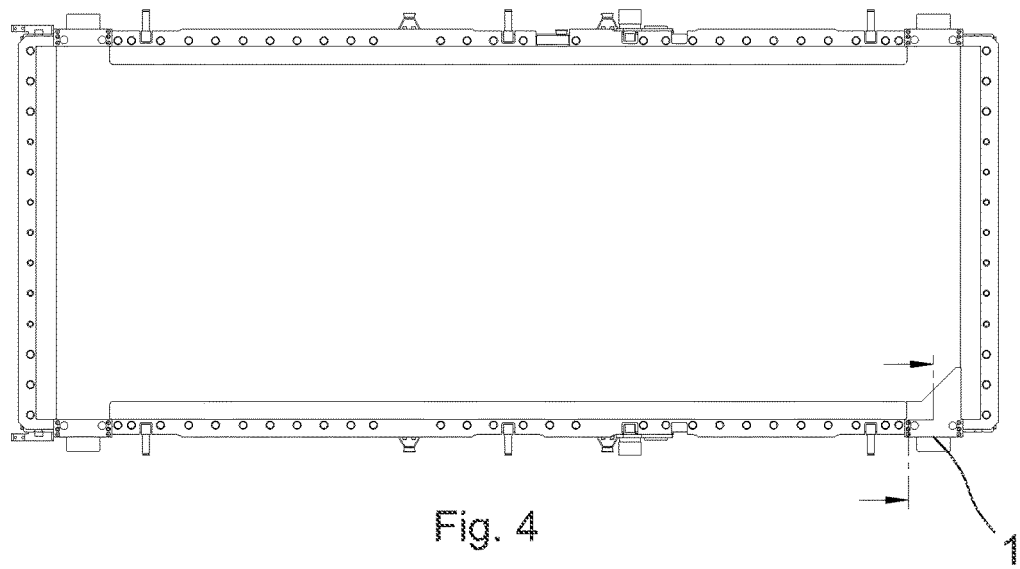
FIG. 4 illustrates a plan view of the arrangement shown in FIG. 1.

FIG. 4 is a plan view of the arrangement shown in FIG. 1. Particularly, FIG. 1 illustrates a dot-dashed line along, which the partial cut-views of FIG. 5 and FIG. 6 are seen.

Figure 5:
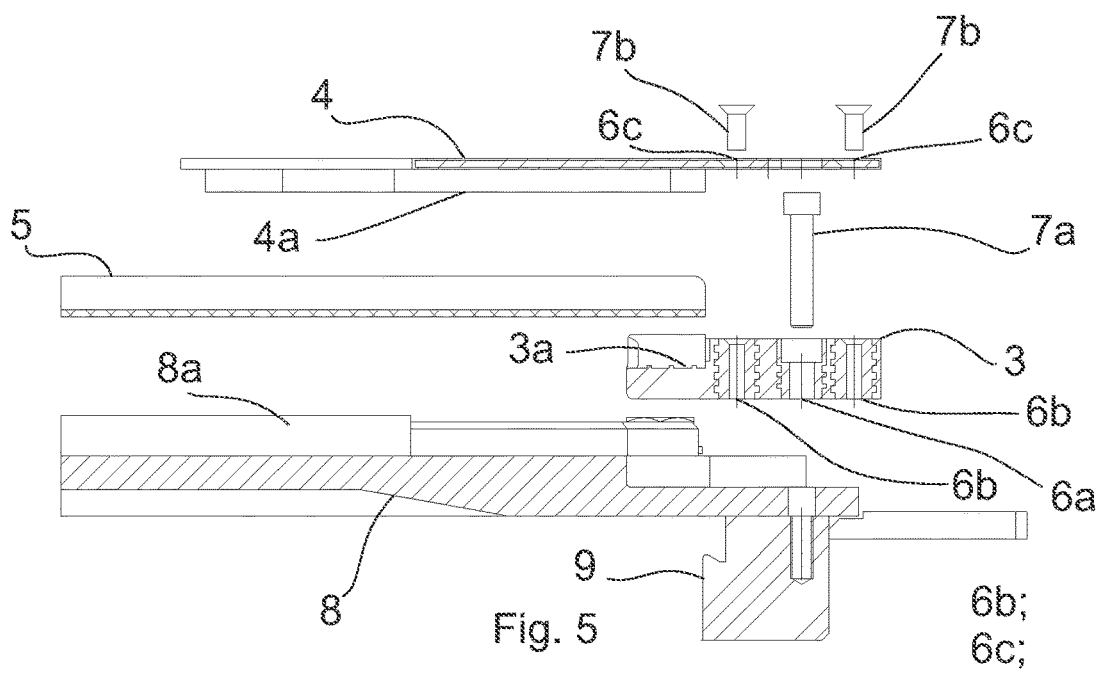
FIG. 5 illustrates a partial cut view along the dash-dotted line of FIG. 4, as seen as an exploded configuration.
Figure 6:
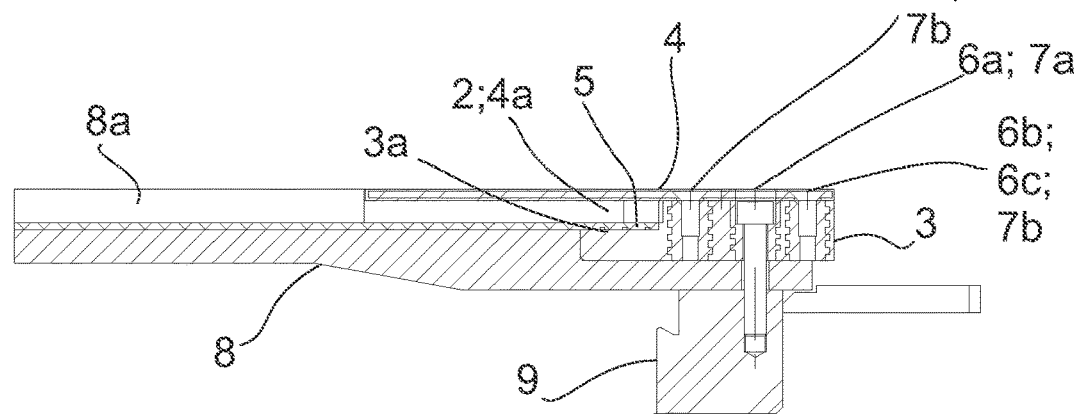
FIG. 6 illustrates the partial cut view of FIG. 6 as seen as a non-exploded configuration.

FIG. 5, illustrates an exploded cut view of the outlet piece assembly 1 along the dashed lined shown in FIG. 4, whereas FIG. 6 illustrates the same in a non-exploded configuration. Particularly FIG. 5 and FIG. 6 further illustrating how the base 3 and lid 4 of the outlet piece assembly 1 are arranged with respect to the filter plate 8 and the vat liner 5. Particularly the recessed seat 3*a* of the base 3 can be seen to be flush with the filtrate vat 8*a* and that the vat liner 5 extends over the recessed seat 3*a*. Furthermore, the projections 4*a* provided as ribs of the lid 4 can be seen to press against the vat liner 5, thereby securely clamping it in place and sealed against the recessed seat 3*a*. Furthermore, the base 3 can be attached to the plate frame 9 through the filter plate 2.

Although the present disclosure has been discussed above in connection with the appended drawings, in which the filtrate vat 8*a* is integrally formed on the filter plate 8, it should be noted that outlet piece assembly 1 may alternatively also be configured to be used with a conventional separate filtrate vat, in which case the filtrate vat itself extends into the outlet piece assembly 1 in a similar manner as shown with the vat liner 5.

LIST OF REFERENCE NUMERALS

1 outlet piece assembly
1*a* vat end
1*b* discharge end
2 internal conduit
3 base
3*a* recessed seat
3*b* chute
4 lid
4*a* projection
5 vat liner
6*a* first attachment hole
6*b* second attachment hole
6*c* third attachment hole
7*a* first fixing element
7*b* second fixing element
8 filter plate
8*a* filtrate vat
9 plate frame

The invention claimed is:

1. An outlet piece assembly for conducting filtrate out from a filtrate vat of a horizontal filter press, comprising:
   an internal conduit for conducting the filtrate;
   a base removably attachable to the horizontal filter press;
   a lid removably fixed to the base, wherein the internal conduit is formed between the base and the lid, and runs between a vat end and a discharge end of the outlet piece assembly; and
   a recessed seat at the vat end of the outlet piece assembly, wherein the recessed seat is configured such that a portion of a filtrate vat component or a portion of the filtrate vat is receivable in the recessed seat,
   wherein the lid comprises one or more projections extending towards the base, and wherein the outlet piece assembly is configured for clamping the portion of the filtrate vat component or a part of the filtrate vat, received in the recessed seat, between the projections and the recessed seat, thereby securing the outlet piece assembly with respect to the portion of the filtrate vat.

2. The outlet piece assembly according to claim 1, wherein the projections are provided as one or more elongate ribs extending in the direction of the internal conduit.

3. The outlet piece assembly according to claim 1, wherein a seal arrangement is provided at the recessed seat configured for sealing against the associated part of the filtrate vat component or the associated part of the filtrate vat received at the recessed seat.

4. The outlet piece assembly according to claim 1, wherein the base comprises a recessed chute at the discharge end as a continuation of the recessed seat for conducting filtrate out of the outlet piece assembly.

5. The outlet piece assembly according to claim 1, wherein the at least the base and the lid are made of a creeping-resistant material, chosen from a group comprising metals, FRP (fibre-reinforce plastics) materials, reinforced composite materials with a thermoset or thermoplastic matrix, and thermoset materials.

6. The outlet piece assembly according to claim 1, wherein at least the portions of the base and lid forming the internal conduit are coated with a wear-resistant material, chosen from a group comprising wear resistant polymers, thermoplastics including thermoplastic vulcanizates and thermoplastics elastomers, PUR (polyurethane) and rubber.

7. The outlet piece assembly according to claim 1, wherein the base comprises one or more first attachment holes extending therethrough and configured for receiving a fixing element for attaching the base to the filter press.

8. The outlet piece assembly according to claim 7, wherein the one or more first attachment holes are situated on a portion of the base not forming a part of the internal conduit.

9. The outlet piece assembly according to claim 1, wherein the base comprises one or more second attachment holes, and the lid comprises one or more third attachment holes, aligned with the second attachment holes, the lid being fixed to the base with a fixing element inserted into the second attachment hole through the third attachment hole.

10. The outlet piece assembly according to claim 9, wherein the one or more second attachment holes are situated on a portion of the base not forming a part of the internal conduit, and the one or more third attachment holes are situated on a portion of the lid not forming a part of the internal conduit.

* * * * *